US007470339B2

(12) United States Patent

Hoffmann, Sr. et al.

(10) Patent No.: US 7,470,339 B2

(45) Date of Patent: Dec. 30, 2008

(54) PRESSURE SENSITIVE ADHESIVE REPAIR PATCH PRODUCT

(76) Inventors: Dennis Hoffmann, Sr., 985 Westshore Dr., Fox Lake, IL (US) 60020; Ray Hubert, 1275 Justine Dr., Kankakee, IL (US) 60901

( * ) Notice: Subject to any disclaimer, the term of this patent is extended or adjusted under 35 U.S.C. 154(b) by 357 days.

(21) Appl. No.: 11/457,424

(22) Filed: Jul. 13, 2006

(65) Prior Publication Data

US 2008/0163975 A1 Jul. 10, 2008

Related U.S. Application Data

(62) Division of application No. 10/763,481, filed on Jan. 23, 2004, now abandoned.

(51) Int. Cl.

| | |
|---|---|
| ***E04F 13/07*** | (2006.01) |
| ***B29C 65/54*** | (2006.01) |
| ***B29C 73/04*** | (2006.01) |
| ***B32B 38/18*** | (2006.01) |
| ***B32B 43/00*** | (2006.01) |

(52) U.S. Cl. .......................... 156/71; 156/94; 156/234; 156/246; 156/247; 156/249

(58) Field of Classification Search .................. 156/71, 156/94, 230, 234, 237, 246, 247, 249
See application file for complete search history.

(56) References Cited

U.S. PATENT DOCUMENTS

| | | | | |
|---|---|---|---|---|
| 2,191,704 | A | 2/1940 | Bennett | |
| 3,087,850 | A | 4/1963 | Cole | |
| 3,343,978 | A | 9/1967 | Engelbach | |
| 3,615,992 | A | 10/1971 | Jeffries | |
| 3,741,786 | A | 6/1973 | Torrey | |
| 4,331,727 | A | 5/1982 | Maas | |
| 4,728,380 | A | 3/1988 | Jones et al. | |
| 4,851,074 | A | 7/1989 | Uchida | |
| 5,049,434 | A | 9/1991 | Wasulko | |
| 5,130,185 | A | 7/1992 | Ness | |
| 5,498,455 | A | 3/1996 | Roberts | |
| 5,626,928 | A | 5/1997 | Summer | |
| 5,747,738 | A | 5/1998 | Indoe | |
| 6,143,118 | A | 11/2000 | Hornaman et al. | |
| 7,300,533 | B2 * | 11/2007 | Lucero | 156/71 |

FOREIGN PATENT DOCUMENTS

FR 2819521 A1 * 7/2002

OTHER PUBLICATIONS

English abstract of FR 2,819,521, Jul. 2004.*

* cited by examiner

*Primary Examiner*—Philip C Tucker
*Assistant Examiner*—Sing P Chan
(74) *Attorney, Agent, or Firm*—Miller, Matthias & Hull

(57) ABSTRACT

A repair device which includes an intermittent coating of PSA on a first side of a sheet of release paper. The cured PSA may be easily transferred to a surface by pressing the release paper against the surface thereby effectively transferring the intermittent coating of PSA to the surface. The improved repair device is useful for repairing delaminated or detached wallpaper; holding wall patch repair devices in place during the application of spackling or repair compound and holding door hinges in place during the installation thereof.

5 Claims, 3 Drawing Sheets

PRESSURE SENSITIVE ADHESIVE REPAIR PATCH PRODUCT

CROSS-REFERENCE TO RELATED APPLICATIONS

This is a divisional of application Ser. No. 10/763,481, filed on Jan. 23, 2004, now abandoned.

TECHNICAL FIELD

An improved system for applying pressure sensitive adhesive to a surface or substrate as disclosed. More specifically, pressure sensitive adhesive is applied intermittently, such as in a swirl pattern, dot pattern, checkerboard patterns etc is deposited on a first side of a release paper or release sheet. The pressure sensitive adhesive is then allowed to cure. The adhesive is applied to a surface such as the back side of a detached piece of wallpaper or the surface of an item such as a piece of hardware that needs to be installed by simply pressing the release paper against the surface with the cured pressure sensitive adhesive sandwiched therebetween which will then result in a pressure sensitive adhesive being transferred from the release paper to the back side of the detached wallpaper of the hardware item. A cover sheet of release paper may also be used and applied over the cured pressure sensitive adhesive and first side of the primary release paper or sheet. The pressure sensitive adhesive may be of the permanent or temporary types.

DESCRIPTION OF THE RELATED ART

One of the problems facing consumers who have installed wallpaper in their homes, offices or other buildings is the tendency of some portions of the wallpaper to become delaminated from the wall or surface to which it was originally adhered. Wallpaper glue can crack and become brittle with age and the lamination between the wallpaper and the wall can be lost. As a result, portions of the wallpaper, particularly corners of a piece of wallpaper can become separated from the wall of surface to which it is intended to be adhered or laminated. Consumers are then forced to use commercially available glue to re-adhere the wallpaper in place. If too much glue is used, the glue can seep out from beneath the wallpaper over other sections of the wallpaper thereby making the repair job easily visible to even untrained eyes. Liquid glue can also coat the user's hands and other fixtures, such as plate covers for electrical outlets and light switches thereby causing aggravation and frustration.

Thus, there is a need for an improved method and system for permanently reattaching wallpaper that has become delaminated from the wall surface.

Another problem faced by consumers during home repairs is the need to temporarily install a device on a vertical surface which will then be permanently attached using plaster, patching compound or fastener's such as screws, nails or bolts Specifically, perforated metal repair patches are used to repair a piece of broken drywall. Some of these patches are sold with a layer of pressure sensitive adhesive on one side to secure the patch in place during the application of patching compounds over the perforated metal sheet.

However, in manufacturing these products, it is very difficult to apply the coating of pressure sensitive adhesive providing the metal mesh of perforated sheet with pressure sensitive adhesive drives up the manufacturing costs and packaging costs. Thus, if there was a way to quickly and easily temporarily hold such a metal perforated repair patch in place on a vertical surface while the user is preparing to install or apply patching compound over the perforated sheet, manufacturers could sell the sheets without the pressure sensitive adhesive and the associate manufacturing difficulties. As a result, less expensive repair patches could be provided.

Further, other home repairs require fixtures to be temporarily suspended or held in place on a wall while permanent fasteners are prepared and installed. One such example is during the installation of hanging door hinges. Specifically, it would be very convenient to provide a means for temporarily securing a door hinge in place while the holes are drilled for the wood screws that eventually are used to permanently attach the door hinge to the frame and/of the edge of the door. Consumers must hold the hinge in place, mark the hole pattern, remove the hinge and then drill the holes. Currently, no such "temporary" attachment mechanism is available other than quick-dry adhesives and glues which would eliminate the holding, marking and removing steps. This solution is not preferred due to the problems of using liquid adhesives which can be messy and soil nearby surfaces if too much liquid adhesive is applied and allowed to seep outward once the door hinge is pressed into place. Liquid adhesives can also block or plug the holes through which the screws or fasteners must pass to permanently attach the hinge to the door frame.

Therefore, in addition to a need for an improved method of preparing wallpaper, there is also a general need for a product which can quickly and easily attach and fixture or mechanical device to a vertical surface temporarily while the user is preparing to permanently attach the fixture or device in place.

Also, it is often necessary to permanently attach a fixture in place during remodeling or construction. On such example is a nail guard which is used to protect pipes and electrical conduits behind drywall or wall board. These fixtures need to be installed permanently and it would be much easier to do so if there was a convenient way to make them self-adhesive.

SUMMARY OF THE DISCLOSURE

In satisfaction of the aforenoted needs, an improved repair device is disclosed. In an embodiment, a repair device comprises a sheet, section, or roll of release paper having a first side and a second side. On the first side, pressure sensitive adhesive (PSA) is applied intermittently to the first side of the release paper The PSA is then allowed to cure. The PSA may be of the temporary or permanent type.

The release paper may then be used as a repair device as follows. For a section of wallpaper that has become delaminated from a wall, the first side of the release paper may be applied against the back side of the detached portion of the wallpaper. Pressure may be applied to the second opposing side of the release sheet which results in a transferal of the pressure sensitive adhesive to the back side of the wallpaper. The wall paper then may be reattached to the wall surface by simply pressing the wallpaper against the wall surface with the transferred PSA sandwiched therebetween.

Similarly, to temporarily or permanently hang a mechanical device, repair mesh or other device to a vertical surface, the first side of the release paper may be pressed against the back side of the device that will engage the vertical surface and pressure applied to the second opposing side of the release paper results in transferal of the PSA to the device. Then, the repair patch, door hinge or other device is pressed against the vertical wall surface with PSA sandwiched therebetween to temporarily or permanently attach the repair patch, door hinge or other device to the vertical wall surface. One advantage of the disclosed repair device is that the PSA will not plug or block the holes of the door hinge, repair mesh or other fixture. Further, use of the disclosed repair device can render a fixture such as a door hinge, nail guard or other fixture "self-adhering" thereby eliminating the need for liquid adhesive and its disadvantages as disclosed above.

In a refinement, the release paper is silicone coated on both sides and rolled up so the side of the release paper without cured adhesive thereon serves as a protective cover for the cured PSA.

In another refinement, various methods of making home repairs utilizing the above repair device are also disclosed. For example, an improved method of repairing a detached section of wallpaper is disclosed. An improved method of installing a door hinge is also disclosed. Further, an improved method of utilizing a perforated metal patch to repair a section of drywall or automobile body is also disclosed.

BRIEF DESCRIPTION OF THE DRAWINGS

The disclosed embodiments and methods are described more or less diagrammatically in the accompanying drawings wherein.

The drawings are not necessarily to scale and the embodiments are only described as fragmentary views and diagrammatic representations. It should be understood, that this disclosure is not necessarily limited to the particular embodiments illustrated herein.

DETAILED DESCRIPTION OF THE PRESENTLY PREFERRED EMBODIMENTS

Figure 1:
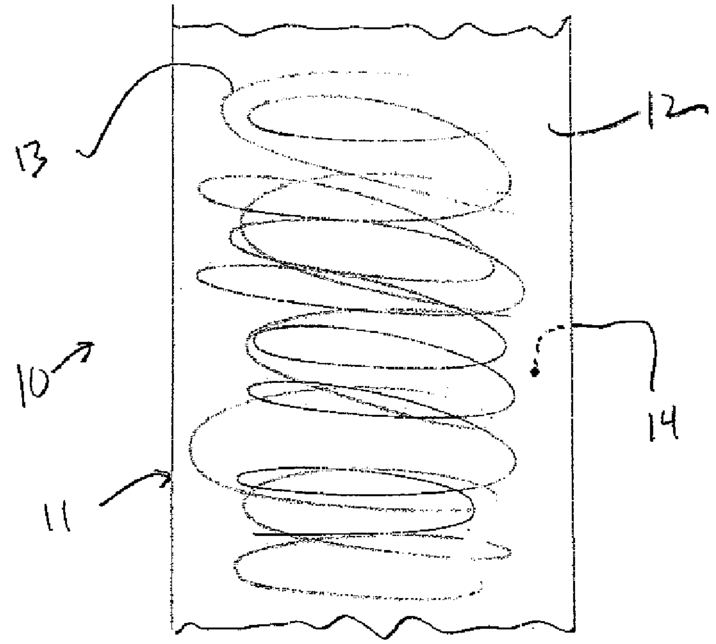
FIG. 1 is a front plan view of a sheet of release paper with an intermittent coating of PSA thereon.

FIG. 1 is a plan view illustrating a repair device 10 that includes a sheet 11 of release paper having a first side 12 which is intermittently coated with PSA 13. The sheet 11 of release paper also includes a second side 14 which is opposite the first side 12. The release substrate or paper 11 typically includes a silicone coating (not shown) applied to at least one surface 12. Other coated films, such as polyesters and polypropylenes could also be used to coat the release sheet 11. Further other polyolefins could be used that have inherent release characteristics.

The PSA is preferably an aqueous emulsion polymer composition or an organic solution polymer composition having pressure sensitive adhesives for (PSA) properties. Suitable PSA polymer compositions that have an adhesive characteristic include polyethylene terephthalate. Other suitable PSA compositions can comprise a polymer or a copolymer of at least one ethylenically unsaturated monomer, such as acrylic monomers.

Exemplary acrylic monomers include esters of acrylic acid with an alkyl group having from 1 to 18 carbon atoms, including methyl, ethyl, n-butyl, sec-butyl, the various isomeric pentyl, hexyl, heptyl, and octyl (especially 2-ethylhexyl), lauryl, cetyl, stearyl, and like groups; and alkyl esters of methacrylic acid with an alkyl group having from 4 to about 18 carbon atoms, including n-butyl, n-hexyl, 2-ethylhexyl, n-octyl, lauryl, cetyl, stearyl and like groups. Polymers derived from styrene and butadiene or styrene and isoprene are also suitable. The above polymer compositions may also contain other modifying monomers such as acrylic and methacrylic acid and their esters, vinyl acetate, ethylene, acrylonitrile, and styrene. In addition, tackifying resins can optionally be part of the compositions; for example, rosin and rosin derivatives such as rosin esters and hydrogenated rosin, tall oil and derivatives, or hydrocarbon resins well known in the PSA art. Wetting agents, defoamers, and possibly thickeners can also be added to the PSA polymer compositions to render them suitable for the coating process.

Pressure-sensitive adhesives can be formulated to fit specific performance requirements, including sufficient shear; peel adhesion, and tack or quickstick, at various temperatures and on a variety of substrates. Depending on the choice of facestock to which they are laminated, and the substrates to which they are applied, PSAs may be classified as more or less "permanent" or "temporary." When a permanent PSA tape or label is adhered to a substrate, the adhesive bond to the substrate glows over time, and the backing material cannot be removed without damaging the backing and/or the substrate, or without leaving an adhesive residue on the substrate. In contrast, temporary PSAs can be removed from a substrate by application of a relatively small peel force, even after an extended period of time, because adhesion to the substrate remains constant, or grows only slightly over time.

A liquid or wet PSA polymer composition is applied to the surface 12 of the release paper 11 in an intermittent fashion, such as the swirling pattern shown at 13 in FIG. 1. Equipment used for such as swirled pattern as shown in FIG. 1 is known in the art and simply includes a nozzle connected to a PSA polymer composition reservoir under pressure.

After deposition of the PSA on the first side 12 of the release substrate or paper 11, the PSA coating 13 is allowed to dry or cure. Drying can be performed by passing the paper 12 through a dryer or oven that is suitable temperature and airflow to reduce the moisture level below 5% by weight to achieve a cured state.

Figure 1A:
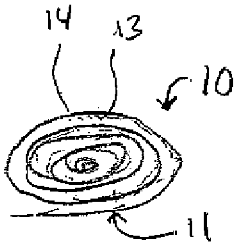
FIG. 1A is an end view of the release paper with intermittent PSA coating thereon as shown in FIG. 1 but in a roll form.

The thickness of the cured PSA material can vary widely and range from about 1 to 2 mils to about 10 mils. The cured PSA material 13, after coating on the first side 12 of the release substrate 11, can then be laminated onto a vertical wall surface by simply pressing the first side 12 of the release paper 11 to the vertical wall surface and effectively transferring the PSA 13 to the vertical wall surface by applying pressure to the back or second side 14 of the release paper 11. Of course, the protective release paper layer 15 has been removed in advance if such a protective release paper layer 15 is provided after curing of PSA 13. Then, as shown in FIG. 1A, the sheet may be rolled up using the second side 14 as a protective cover for the adhesive 13. In this case, the second side 14 should be coated with silicone as well.

Figure 2:
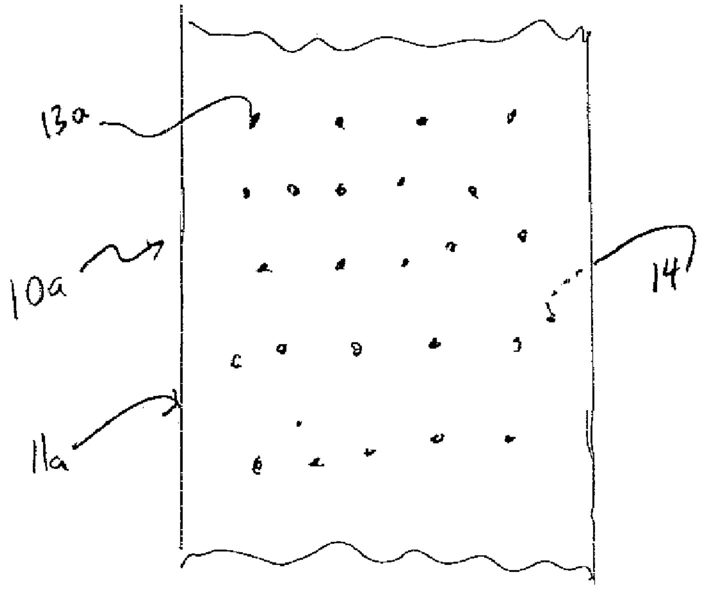
FIG. 2 is a front plan view of an alternative embodiment whereas instead of the swirling pattern disposed in FIG. 1, the PSA is applied in an intermittent stock pattern as shown.

An alternative embodiment of a repair device 10*a* is shown in FIG. 2 wherein the first side 12*a* of the release sheet 11*a* is coated with PSA material 13*a* in a dot pattern.

Figure 3A:
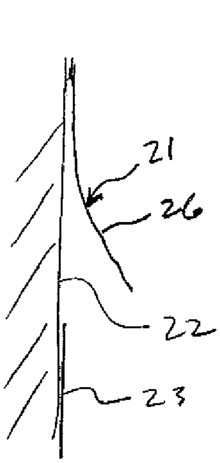
FIGS. 3A-3D illustrate, schematically, a disclosed method for repairing a detached piece of wallpaper in accordance with the disclosed methods.
Figure 3B:
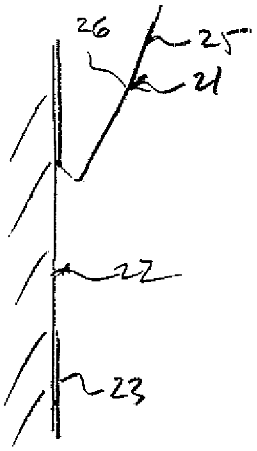
Figure 3C:
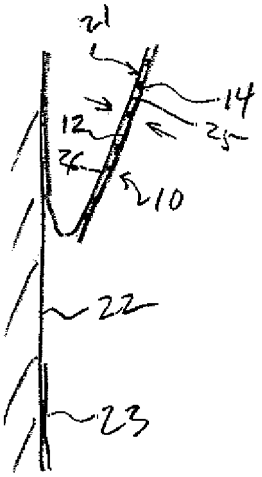
Figure 3D:
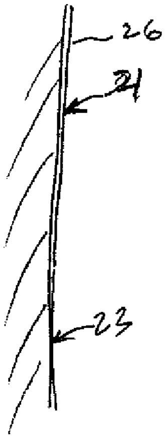

FIGS. 3A-3D illustrate a disclosed method for repairing a piece of wallpaper 21 that has become detached from a vertical wall surface 22. A piece of properly laminated wallpaper 23 is also shown. As shown in FIG. 3B, the detached wallpaper 21 is pulled upward or away from the vertical wall surface 22 under repair. A release device 10 is shown as it is being moved into position with the cured PSA 13 facing the back side 25 of the detached wallpaper 21. As shown in FIG. 3C, pressure is applied to the rear side 14 of the release paper and the front side 26 of the wallpaper 21 thereby causing transfer of the PSA 13 from the first side 12 to the back side 25 of the wallpaper 21. The release paper of the device 10 has been removed thereby leaving the PSA 13 against the wallpaper surface 25 which is then ready to be pressed back into place against the wall surface 22 as shown in FIG. 3D. Use of a permanent PSA 13 render s the repair permanent.

Figure 4A:
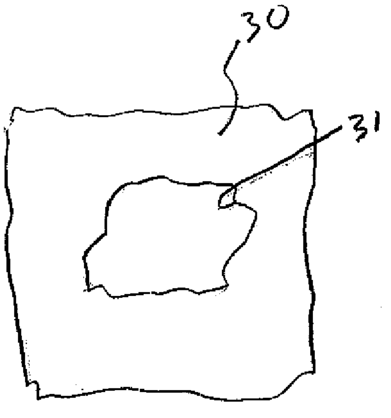
FIGS. 4A-4C illustrate, schematically, a disclosed method for repairing a hole in a piece of drywall or other vertical surface such as an automobile exterior panel.
Figure 4B:
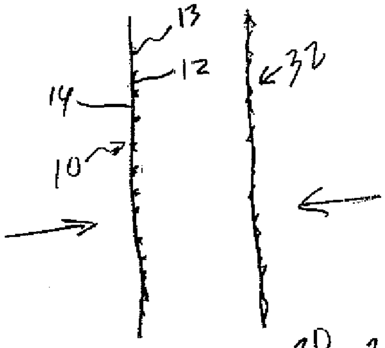
Figure 4C:
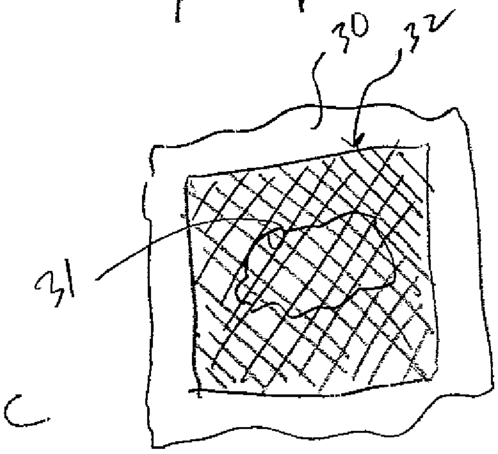

In FIGS. 4A-4C, a vertical wall surface has been damaged by causing a hole 31. As shown in FIG. 4B, the device 10 as discussed above can be applied to a repair mesh 32 to leave an intermittent coating of PSA 13 on one side of the repair mesh 32. Then, as shown in FIG. 4C, the repair mesh 32 and may be temporarily (or permanently) installed on the wall surface 30, thereby covering the hole 31 and the mesh or sheet 32 will stay in place while the user is applying spackling or repair compounds (not shown). The same techniques may be used to permanently mount a nail guard in place that is, a device 10 with permanent PSA 13 can be pressed against a nail guard to render it self adhering and then the nail guard may be pressed into place at the desired location.

Figure 5A:
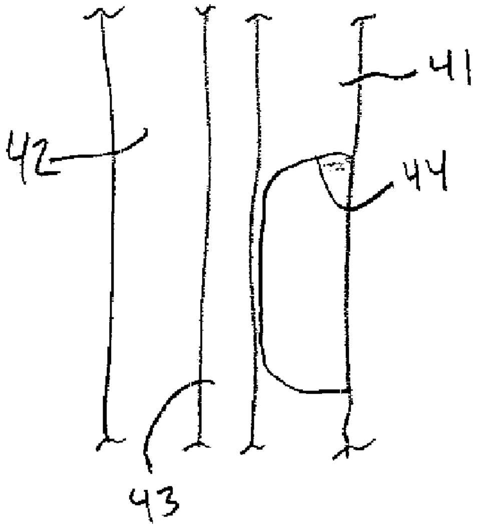
FIGS. 5A-5C illustrate an improved method for installing a door hinge in accordance with the disclosed methods.
Figure 5B:
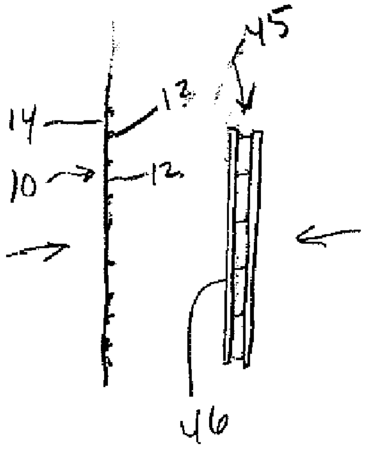
Figure 5C:
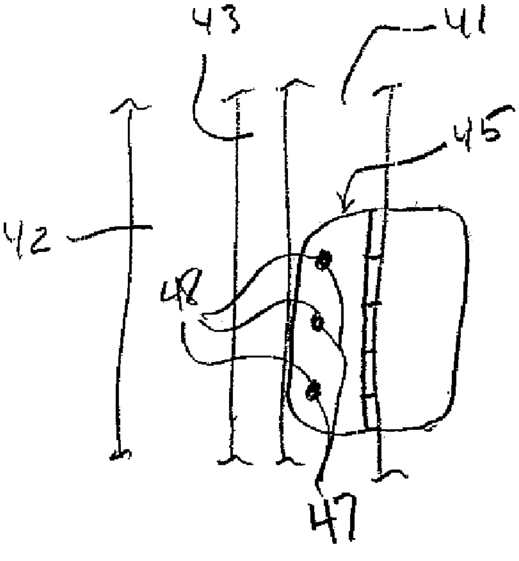

Turning to FIGS. 5A-5B, a door jam 41 is shown with inner and outer frame components 41, 42 and a jam 43 disposed therebetween. A recess 44 is cut into the frame member 41 and ready to receive a door hinge 45. As shown in FIG. 5B, to facilitate this process, PSA 13 is applied to the surface 46 of the hinge 45 without blocking or plugging the screw holes (now shown in FIG. 5B) using the repairs devices 10, 10*a* described above and then the hinge 45 may be temporarily installed in the recess 44 as shown in FIG. 5C. Then holes 47 may be drilled through the screw holes 48 with the hinge 45 in place as shown in FIG. 5C and screws (not shown) are installed.

Although only certain embodiments have been shown and described, alternative embodiments will be apparent to those skilled in the art. These and other alternatives are considered equivalents and within the spirit and scope of this disclosure, which is intended to be limited only by the appended claims.

What is claimed is:

1. A method for re-adhering wallpaper that has become separated from a wall surface, the method comprising:

providing a repair device comprising a sheet of release paper having a first side first coated with silicone and subsequently coated intermittently with PSA that has been cured thereon, the sheet also having a second side, pressing the first side of the sheet against a back side of the wallpaper that has become separated from the wall by applying sandwiching pressure to the second side of the sheet and the front side of the wallpaper thereby sandwiching the PSA between the first side of the sheet and the back side of the wallpaper, removing the sheet from the wallpaper thereby leaving the PSA behind on the back side of the wallpaper, pressing the separated wall paper back in place onto the wall surface.

2. The method of claim 1 wherein the PSA is applied to the first side of the primary sheet in a swirl pattern.

3. The method of claim 1 wherein the PSA is applied to the first side of the primary sheet in a dotted pattern.

4. A method for re-adhering wallpaper that has become separated from a wall surface, the method comprising:

providing a repair device comprising a sheet of release paper having a first side first coated with silicone and subsequently coated intermittently with a random swirl pattern of PSA that has been cured thereon, the sheet also having a second side, pressing the first side of the sheet against a back side of the wallpaper that has become separated from the wall by applying sandwiching pressure to the second side of the sheet and the front side of the wallpaper thereby sandwiching the PSA between the first side of the sheet and back side of the wallpaper, removing the sheet from the wallpaper thereby leaving the PSA behind on the back side of the wallpaper, pressing the separated wall paper back in place onto the wall surface.

5. The method of claim 4 wherein the PSA is applied to the first side of the primary sheet in a swirl pattern using a nozzle.

* * * * *